(12) United States Patent
Lin

(10) Patent No.: US 11,186,032 B2
(45) Date of Patent: Nov. 30, 2021

(54) MOBILE PHONE SCREEN PROTECTOR DEVICE

(71) Applicant: Chia-Hao Lin, New Taipei (TW)

(72) Inventor: Chia-Hao Lin, New Taipei (TW)

( * ) Notice: Subject to any disclaimer, the term of this patent is extended or adjusted under 35 U.S.C. 154(b) by 297 days.

(21) Appl. No.: 16/572,610

(22) Filed: Sep. 17, 2019

(65) Prior Publication Data

US 2020/0230868 A1    Jul. 23, 2020

(30) Foreign Application Priority Data

Jan. 17, 2019 (TW) .................................. 108200931

(51) Int. Cl.
*B29C 63/00* (2006.01)
*B32B 37/00* (2006.01)
*B29L 31/34* (2006.01)

(52) U.S. Cl.
CPC ...... *B29C 63/0056* (2013.01); *B29C 63/0004* (2013.01); *B29C 63/0095* (2013.01);
(Continued)

(58) Field of Classification Search
CPC ............ B29C 63/0004; B29C 63/0047; B29C 63/0056; B29C 63/0095; B29C 63/02; B29C 63/04; B29C 2063/0008; B29C 2063/027; B29C 65/7802; B29C 65/7805; B29C 65/7808; B29C 65/7811; B29C 65/7814; B29C 65/782; B29C 65/7823; B29C 65/7832; B29C 65/7844; B29C 65/7855; B29C 66/342; B29C 66/345; B29C 66/73365; B29C 66/861; B32B 37/0046; B32B 37/003; B32B 37/10; B32B 2037/109; B32B 2307/412; B32B 2309/06; B32B 2457/20; B32B 2457/202; B32B 2457/204; B32B 2457/206;
(Continued)

(56) References Cited

U.S. PATENT DOCUMENTS

| | | | |
|---|---|---|---|
| 2014/0338829 A1* | 11/2014 | Peng | ................... B29C 63/0004 156/249 |
| 2017/0190160 A1* | 7/2017 | Peng | ...................... B32B 37/10 |
| 2020/0368974 A1* | 11/2020 | Choung | ............. B29C 66/5326 |

FOREIGN PATENT DOCUMENTS

JP          2003311842 A    *   11/2003

OTHER PUBLICATIONS

Machine translation of JP 2003311842 date uknown.*

* cited by examiner

*Primary Examiner* — John L Goff, II

(74) *Attorney, Agent, or Firm* — Raymond Chan

(57) ABSTRACT

A mobile phone screen protector device includes a positioning seat, a positioning frame, an auxiliary adhesive sheet, a screen protector, and a scraper. The positioning seat has a first raised portion, a second raised portion, and a positioning space between the first and second raised portions for accommodating a mobile phone with a screen facing upward. The first raised portion is higher than the second raised portion. The auxiliary adhesive sheet is adhered to an underside of the positioning frame. The screen protector is adhered to an underside of the auxiliary adhesive sheet. The positioning frame and the auxiliary adhesive sheet are confined to the tops of the first and second raised portions, and the screen protector is inclined at an angle relative to the screen. The scraper is pressed to scrape against the auxiliary adhesive sheet for the screen protector to be adhered to the screen.

5 Claims, 9 Drawing Sheets

(52) U.S. Cl.
CPC ...... *B32B 37/0046* (2013.01); *B29C 63/0047* (2013.01); *B29C 2063/0008* (2013.01); *B29L 2031/3475* (2013.01); *G06F 2200/1634* (2013.01)

(58) Field of Classification Search
CPC .......... B32B 2457/208; B32B 38/1833; B32B 38/1841; B29L 2031/3475; B29L 2031/3437; G06F 2200/1634
USPC ....................................................... 206/454
See application file for complete search history.

MOBILE PHONE SCREEN PROTECTOR DEVICE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a mobile phone screen protector device, and more particularly to a mobile phone screen protector device that can discharge the air smoothly to reduce the chance of contaminating the surrounding dust and facilitate a screen protector to be quickly and accurately attached to the screen of a mobile phone.

Description of Related Arts

Smart phones usually have a large screen. In order to protect the screen from collision and friction, a screen protector made of glass or plastic materials is attached to the screen of a smart phone. As shown in FIG. 1 to FIG. 4, the bottom of a conventional screen protector 10 is provided with a release film 14. A general smart phone comprises a screen 2, an earpiece 3, an operation button 4, a front camera 5, and so on. The screen protector 10 has an upper opening 11, a lower opening 12, a through hole 13, and so on. Except the professionals, it is difficult to accurately attach the screen protector 10 to the screen 2. The application of the screen protector 10 needs to be finished in a very short time. When the release film 14 is removed from the bottom of the screen protector 10, the user directly contacts the screen protector 10. This usually causes the screen protector 10 to be contaminated with dust. In the attachment process, the screen protector will adsorb the surrounding dust particles. These dust particles will form air bubbles during the application of the screen protector, and it is not easy to remove the air bubbles. When the screen protector 10 is to be attached to the screen, one end of the screen protector 10 is first aligned with one side of the smart phone 1 as shown in FIG. 3. It is not easy to know a misalignment with the naked eyes in the beginning. Sometimes, the upper opening 11, the lower opening 12 and the through hole 13 of the screen protector 10 are significantly not aligned with the corresponding parts of the smart phone 1 (as shown in FIG. 4). Therefore, the small through hole 13 is not aligned with the front camera 5, which affects both the appearance and the functionality, and thus is difficult to be practical.

SUMMARY OF THE PRESENT INVENTION

In view of the aforesaid shortcomings, the primary object of the present invention is to provide a mobile phone screen protector device. A screen protector can be quickly and accurately attached to the screen of a mobile phone, and the air can be smoothly discharged to reduce the chance of contaminating the surrounding dust. When in use, a positioning seat and a positioning frame are inclined at an angle, and a scraper is pressed against the screen protector, so that the screen protector is gradually pressed downward at an angle to be adhered from one end of the screen to the other end of the screen. The air can be smoothly discharged to reduce the chance of contaminating the surrounding dust. The screen protector can be quickly and accurately attached to the screen.

In order to achieve the aforesaid object of the present invention, a mobile phone screen protector device is provided. The mobile phone screen protector device comprises a positioning seat, a positioning frame, an auxiliary adhesive sheet, a screen protector, and a scraper. The positioning seat has a rectangular seat body. One short side of the positioning seat is provided with a first raised portion. Another opposite short side of the positioning seat is provided with a second raised portion. The positioning seat has a positioning space between the first raised portion and the second raised portion. The positioning space is configured to accommodate and position a mobile phone with a screen facing upward. The first raised portion is higher than the second raised portion. The positioning frame has a central hole corresponding to the screen of the mobile phone. The positioning frame is in a rectangular shape having a first short side and a second short side to be placed over the first raised portion and the second raised portion. The auxiliary adhesive sheet is adhered and positioned to an underside of the positioning frame. The auxiliary adhesive sheet has a first adhesive portion attached to an underside of the first short side, and the auxiliary adhesive sheet has a second adhesive portion attached to an underside of the second short side. The screen protector is adhered and positioned to an underside of the auxiliary adhesive sheet, so that the positioning frame, the auxiliary adhesive sheet and the screen protector are positioned and adhered together. The first short side of the positioning frame and the first adhesive portion of the auxiliary adhesive sheet are confined to a top of the first raised portion of the positioning seat. The second short side of the positioning frame and the second adhesive portion of the auxiliary adhesive sheet are confined to a top of the second raised portion of the positioning seat. The positioning frame, the auxiliary adhesive sheet and the screen protector are confined to be above the positioning space. The positioning frame, the auxiliary adhesive sheet and the screen protector are inclined at an angle relative to the screen. The screen protector corresponds to the screen but does not touch the screen. The scraper is configured to press and scrape against the auxiliary adhesive sheet through the central hole from an edge of the second short side toward an edge of the first short side so that the screen protector is adhered to the screen in an oblique manner.

In an embodiment of the present invention, one side of the first raised portion, facing the second raised portion, has a first positioning recess. One side of the second raised portion, facing the first raised portion, has a second positioning recess. The positioning space is defined between the first positioning recess and the second positioning recess. The first positioning recess and the second positioning recess are configured to confine and position the mobile phone.

In an embodiment of the present invention, the top of the first raised portion has a first inclined surface that is inclined at a predetermined angle. The top of the second raised portion has a second inclined surface that is inclined at an angle same as that of the first inclined surface. The first adhesive portion of the auxiliary adhesive sheet is attached to the first inclined surface. The second adhesive portion of the auxiliary adhesive sheet is attached to the second inclined surface.

In an embodiment of the present invention, an outer circumference of the top of the first raised portion is provided with a first flange, and an outer circumference of the top of the second raised portion is provided with a second flange. A rectangular area surrounded by the first flange and the second flange forms a limiting space. The positioning frame corresponds in shape to the limiting space. The positioning frame, the auxiliary adhesive sheet and the screen protector are placed together in the limiting space, so that the positioning frame is confined to be above the positioning space.

In an embodiment of the present invention, the first short side and the second short side each have at least one reference hole. The first adhesive portion and the second adhesive portion each have a positioning hole corresponding to the reference hole. The positioning hole is aligned with the reference hole for the auxiliary adhesive sheet to be positioned to the positioning frame.

With the above device, the screen protector is gradually pressed downward at an angle to be adhered from one end of the screen to the other end of the screen, so that the air can be smoothly discharged without generating bubbles. The screen protector can be quickly and accurately attached to the screen, thereby reducing the chance of contaminating the surrounding dust.

DETAILED DESCRIPTION OF THE PREFERRED EMBODIMENT

Figure 1:
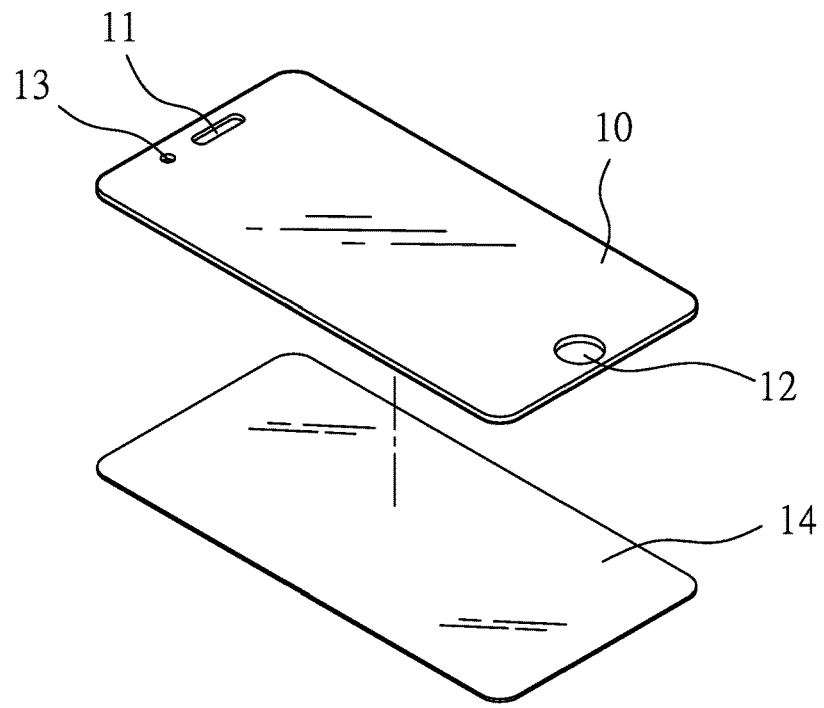
FIG. 1 is an exploded view of a conventional screen protector.
Figure 2:
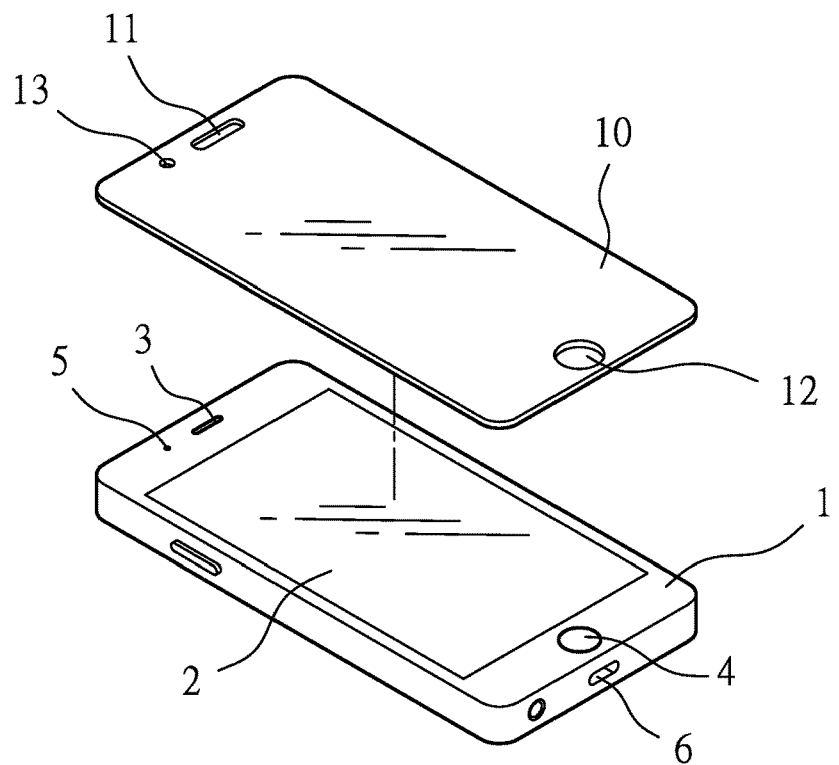
FIG. 2 is an exploded view of the conventional screen protector in cooperation with a mobile phone.
Figure 3:
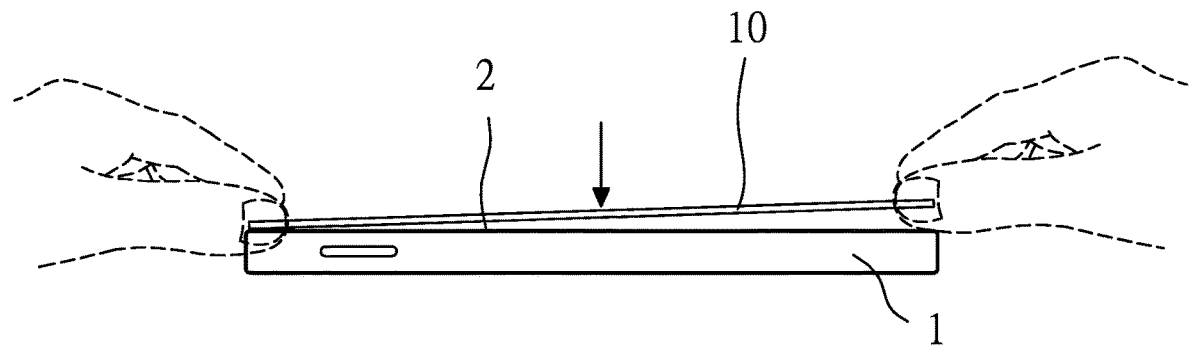
FIG. 3 is a schematic view of the conventional screen protector attached to the screen of the mobile phone.
Figure 4:
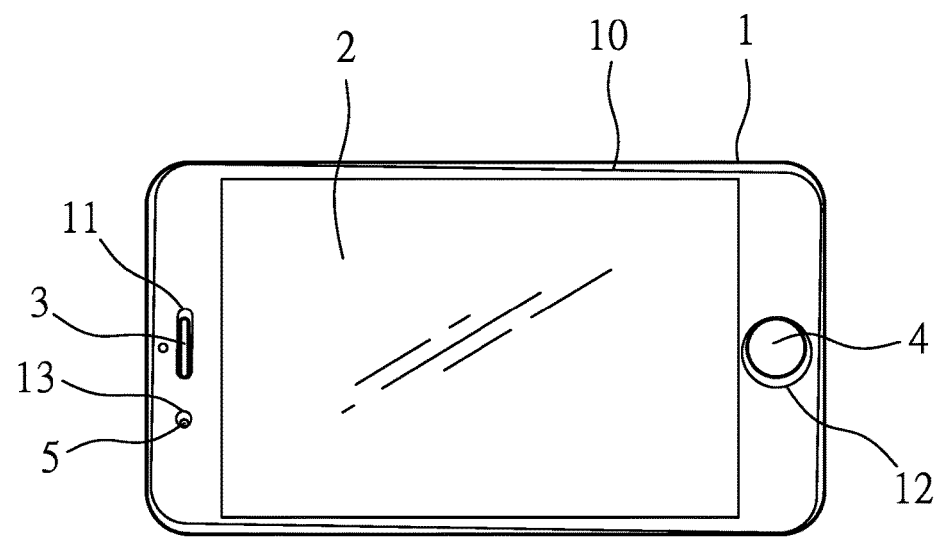
FIG. 4 is a schematic view showing a tolerance when the conventional screen protector is attached to the screen of the mobile phone.
Figure 5:
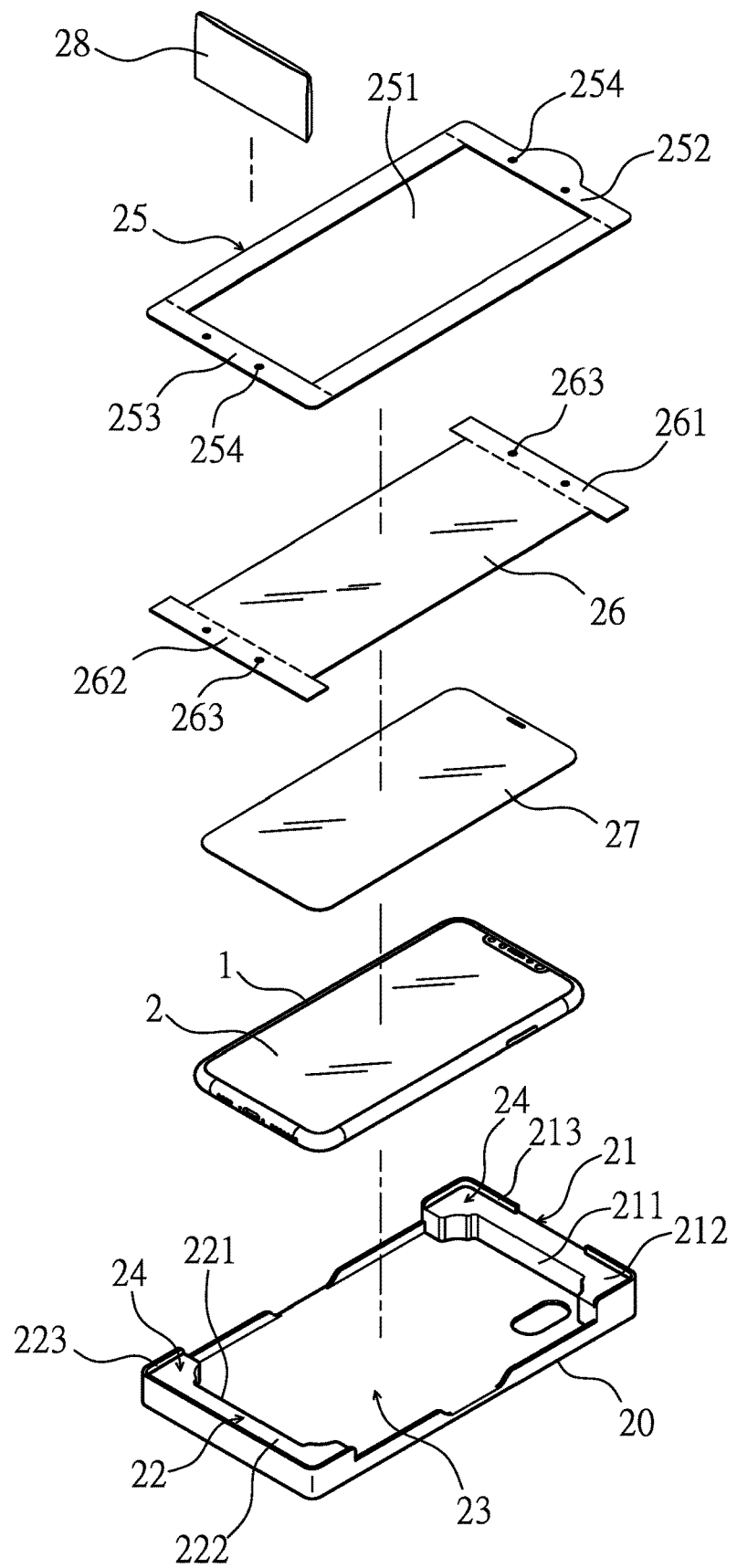
FIG. 5 is an exploded view of the present invention in cooperation with a mobile phone.
Figure 6:
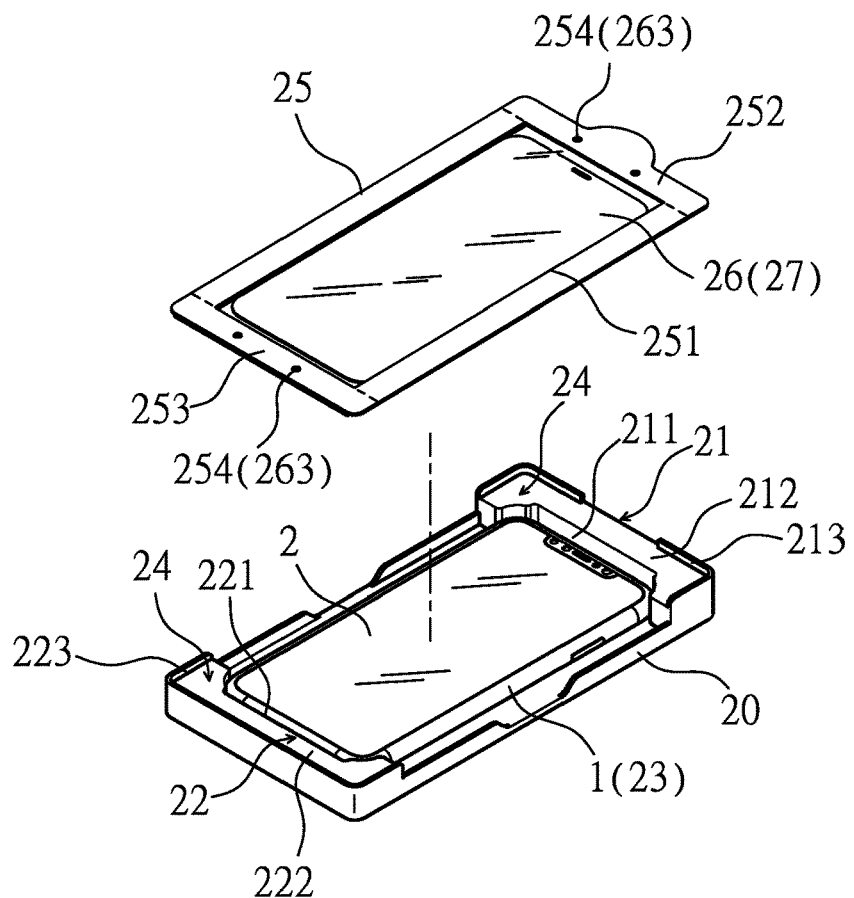
FIG. 6 is an exploded view of the present invention to be attached to the mobile phone.
Figure 7:
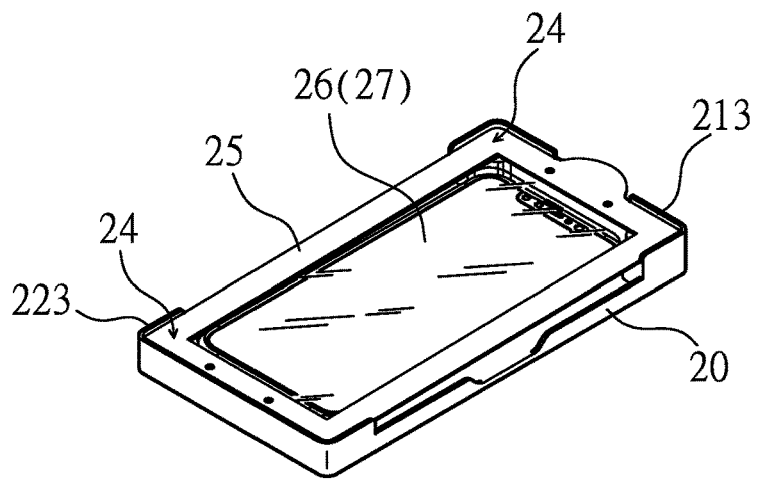
FIG. 7 is a perspective view of the present invention attached to the mobile phone.

Embodiments of the present invention will now be described, by way of example only, with reference to the accompanying drawings.

Referring to FIG. 5 to FIG. 12, a mobile phone screen protector device comprises a positioning seat 20, a positioning frame 25, an auxiliary adhesive sheet 26, a screen protector 27, and a scraper 28.

The positioning seat 20 has a rectangular seat body. One short side of the positioning seat 20 is provided with a first raised portion 21, and another opposite short side of the positioning seat 20 is provided with a second raised portion 22. One side of the first raised portion 21, facing the second raised portion 22, has a first positioning recess 211. One side of the second raised portion 22, facing the first raised portion 21, has a second positioning recess 221. The positioning seat 20 has a positioning space 23 between the first positioning recess 211 and the second positioning recess 221. The positioning space 23 is configured to accommodate a mobile phone 1 with a screen 2 facing upward. The first positioning recess 211 and the second positioning recess 221 are configured to confine and position the contour of the mobile phone 1. The top of the first raised portion 21 has a first inclined surface 212 that is inclined at a predetermined angle. The top of the second raised portion 22 has a second inclined surface 222 that is inclined at an angle same as that of the first inclined surface 212. The height of the first raised portion 21 is greater than that of the second raised portion 22. The outer circumference of the top of the first raised portion 21 is provided with a first flange 213. The outer circumference of the top of the second raised portion 22 is provided with a second flange 223. A rectangular area surrounded by the first flange 213 and the second flange 223 forms a limiting space 24.

The positioning frame 25 has a central hole 251 corresponding to the screen 2 of the mobile phone 1. The positioning frame 25 is in a rectangular shape having a first short side 252 and a second short side 253 to be placed over the first raised portion 21 and the second raised portion 22. The positioning frame 25 corresponds in shape to the limiting space 24. The first short side 252 and the second short side 253 each have at least one reference hole 254.

The auxiliary adhesive sheet 26 is adhered to the underside of the positioning frame 25. The auxiliary adhesive sheet 26 has a first adhesive portion 261 attached to the underside of the first short side 252. The auxiliary adhesive sheet 26 has a second adhesive portion 262 attached to the underside of the second short side 253. The first adhesive portion 261 and the second adhesive portion 262 each have a positioning hole 263 corresponding to the reference hole 254.

The screen protector 27 is adhered to the underside of the auxiliary adhesive sheet 26, and the positioning hole 263 is aligned with the reference hole 254, so that the positioning frame 25, the auxiliary adhesive sheet 26 and the screen protector 27 are positioned and adhered together to be placed in the limiting space 24. The first adhesive portion 261 of the auxiliary adhesive sheet 26 is attached to the first inclined surface 212 of the first raised portion 21, and the second adhesive portion 262 of the auxiliary adhesive sheet 26 is attached to the second inclined surface 222 of the second raised portion 22. The positioning frame 25, the auxiliary adhesive sheet 26 and the screen protector 27 are positioned above the positioning space 23 and are inclined at an angle relative to the screen 2. The screen protector 27 corresponds to the screen 2 but is not in contact with the screen 2.

The scraper 28 is configured to press against the auxiliary adhesive sheet 26 through the central hole 251 of the positioning frame 25. When the scraper 28 is applied with a force to press against the auxiliary adhesive sheet 2 at the edge of the second short side 253, the positioning frame 25 is pressed to be slightly bent and deformed downward, so that one end of the screen protector 27 is in contact with the screen 2. The scraper 28 scrapes from the edge of the second short side 253 toward the edge of the first short side 252, such that the screen protector 27 is adhered to the screen 2 in an inclined manner.

With the above device, the screen protector 27 is gradually pressed downward at an angle to be adhered from one end of the screen 2 to the other end of the screen 2, so that the air can be smoothly discharged without generating bubbles. The screen protector 27 can be quickly and accurately attached to the screen 2, thereby reducing the chance of contaminating the surrounding dust.

The assembly, the function and the details of the aforesaid embodiment are described as follows. As shown in FIG. 5 to FIG. 14, this invention is designed for the screen protector 27 of a single type of mobile phone 1. If the type of the mobile phone 1 is different, the positioning space 23, the positioning frame 25, the auxiliary adhesive sheet 26 and the screen protector 27 can be adjusted in size. The relative position of the auxiliary adhesive sheet 26 and the screen protector 27 is set according to the type of the mobile phone 1. The positioning frame 25 and the auxiliary adhesive sheet 26 are positioned by means of an external device having a positioning post. The reference hole 254 of the positioning frame 25 and the positioning hole 263 of the auxiliary adhesive sheet 26 are simultaneously connected to the positioning post of the external device, so that the auxiliary adhesive sheet 26 can be accurately positioned and attached to the positioning frame 25. Of course, the positioning is not limited to this way. The positioning frame 25 may be provided with a reference mark, and the transparent auxiliary adhesive sheet 26 may be provided with a positioning mark. When the two are attached to each other, the positioning mark is aligned with the reference mark. In this way, the auxiliary adhesive sheet 26 can also be accurately positioned and attached to the positioning frame 25. The positioning frame 25 is made of acrylic, PC or hard plastic materials, so it can be slightly bent and elastically deformed. The auxiliary adhesive sheet 26 is a plastic sheet. The screen protector 27 is a sheet made of scrape-resistant, wear-resistant tempered glass or plastic materials, but not limited thereto.

Figure 8:
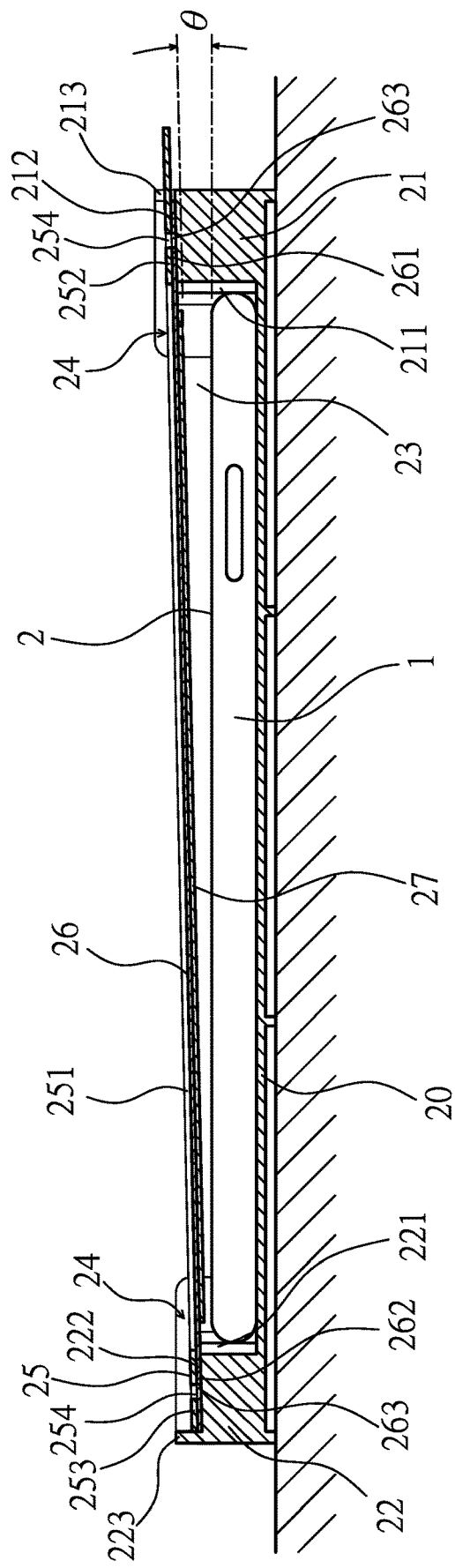
FIG. 8 is a side sectional view of the present invention attached to the mobile phone.
Figure 9:
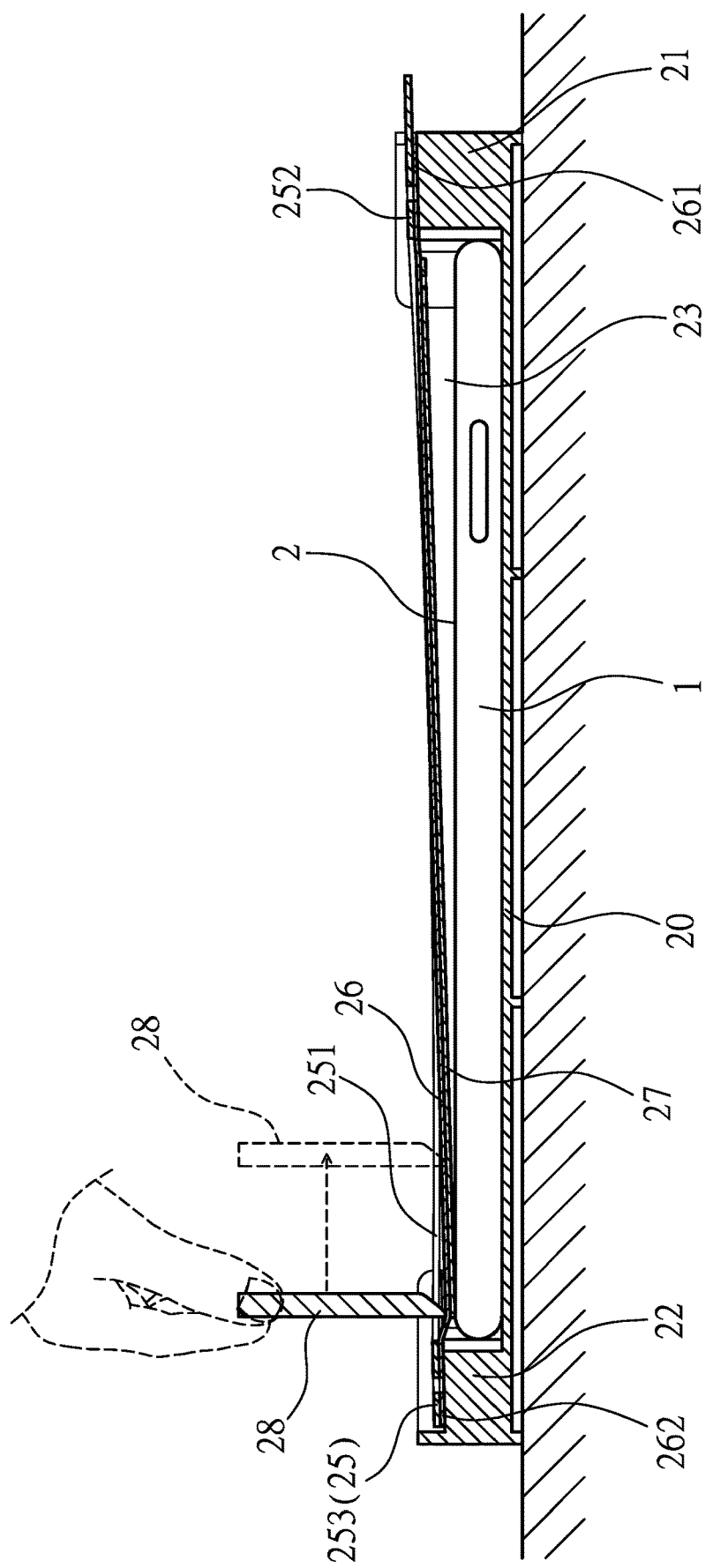
FIG. 9 is a schematic sectional view of the present invention, illustrating that the scraper is pressed to scrape against the auxiliary adhesive sheet.
Figure 10:
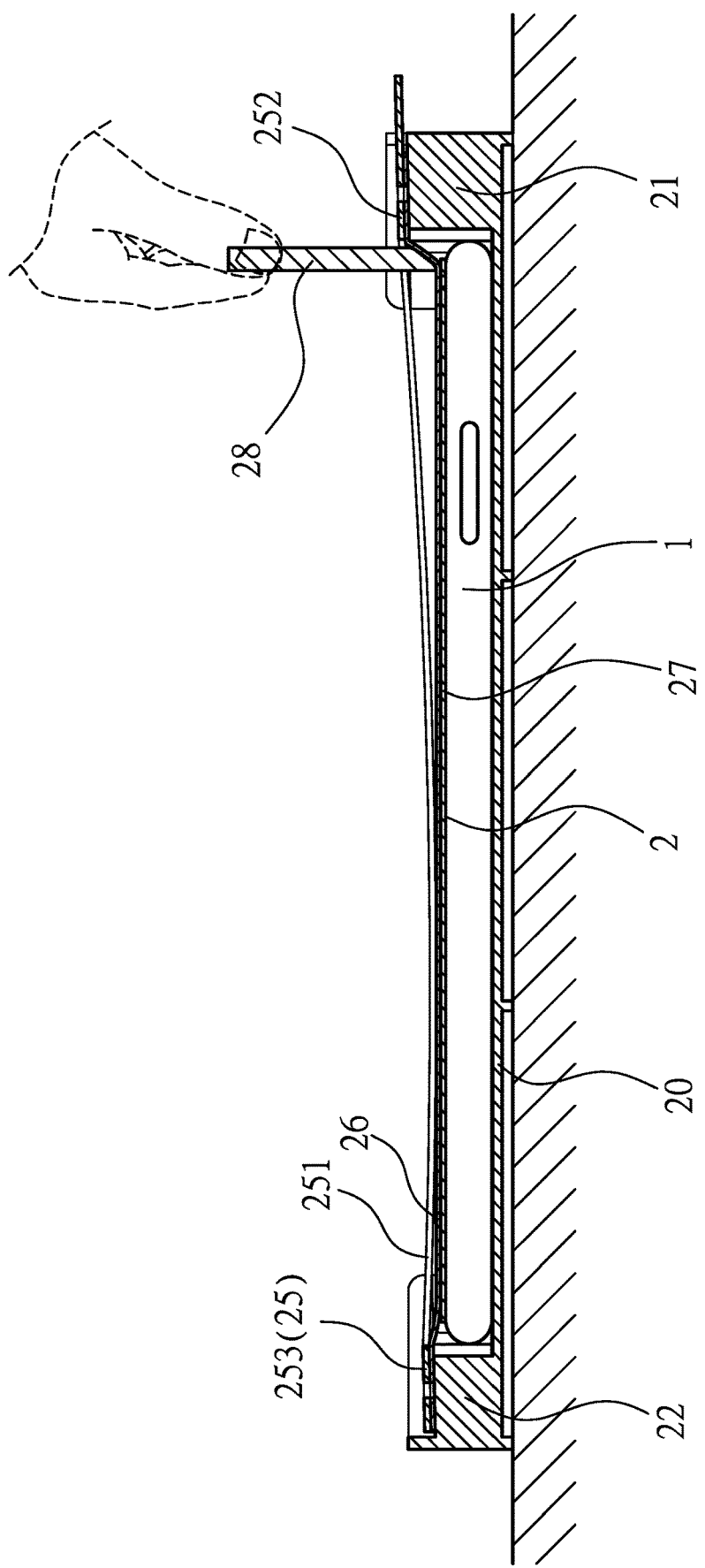
FIG. 10 is a schematic sectional view of the present invention, illustrating that the scraper is moved to the edge of the first short side.
Figure 11:
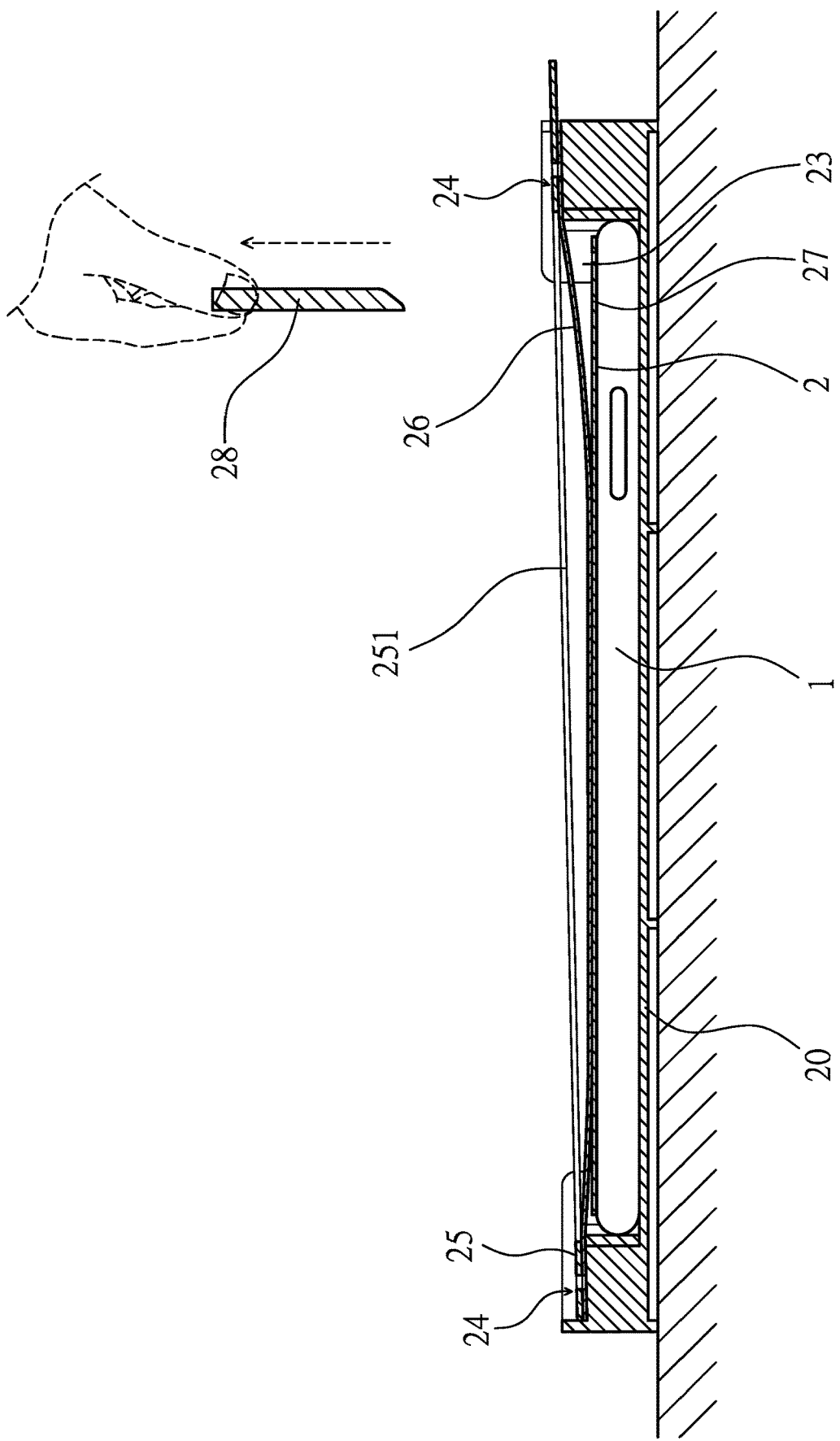
FIG. 11 is a schematic sectional view of the present invention, illustrating that the scraper is removed from the auxiliary adhesive sheet.
Figure 12:
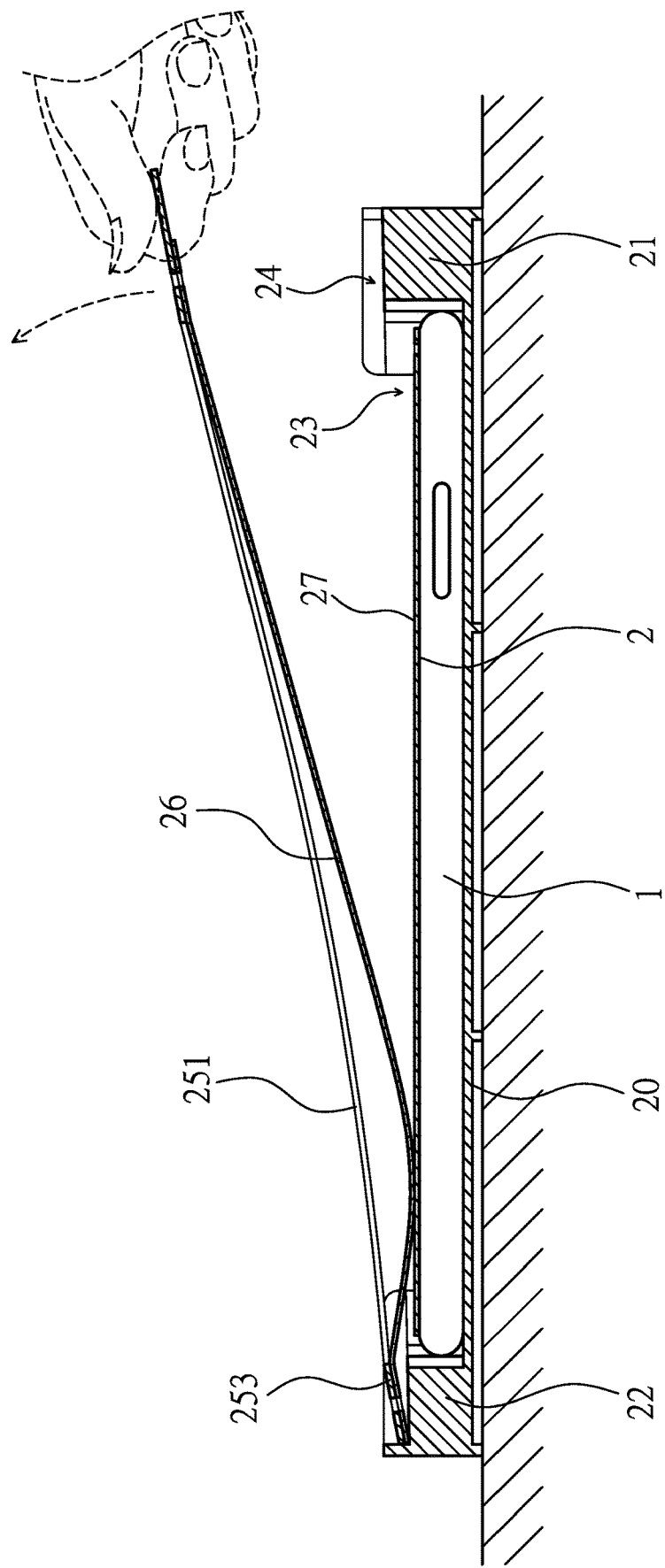
FIG. 12 is a schematic sectional view of the present invention, illustrating that the positioning frame is removed from the limiting space.

When the screen protector 27 is to be attached to the screen 2 of the mobile phone 1, the positioning seat 20 is first placed flat, and the mobile phone 1 is placed in the positioning space 23 of the positioning seat 20, and the screen 2 faces upward. In general, the adhesive surface of the screen protector 27 has a highly viscous adhesive which can be repeatedly applied, and is provided with a release film. In use, the release film needs to be peeled off. Then, the positioning frame 25, the auxiliary adhesive sheet 26 and the screen protector patch 27 are integrally placed on the tops of the first raised portion 21 and the second raised portion 22, so that the positioning frame 25, the auxiliary adhesive sheet 26 and the screen protector 27 are located in the limiting space 24 (as shown in FIG. 8). The first flange 213 and the second flange 223 confine the positioning frame 25 to be above the positioning space 23, not being displaced, so as to position the screen protector 27, such that the screen protector 27 is just to be above the screen 2 of the mobile phone 1 and is not in contact with the screen 2. The first raised portion 21 is higher than the second raised portion 22, and the first inclined surface 212 is higher than the second inclined surface 222, so that the screen protector 27 is inclined at an angle θ relative to the screen 2. Moreover, the auxiliary adhesive sheet 26 can be directly pressed by the scraper 28 via the central hole 251. The scraper 28 is applied with a force to press against the auxiliary adhesive sheet 26 at the edge of the second short side 253. Only the first adhesive portion 261 and the second adhesive portion 262 at both ends of the auxiliary adhesive sheet 26 to which the screen protector 27 is adhered are adhered to the first short side 252 and the second short side 253 of the positioning frame 25, and the other portions of the auxiliary adhesive sheet 26 are in a state of being suspended. When the auxiliary adhesive sheet 26 is applied with a downward force, the auxiliary adhesive sheet 26 will pull the two short sides of the positioning frame 25. The two long sides of the positioning frame 25 are slightly bent downward by gravity, so that the screen protector 27 can be placed close to the screen 2. The lower edge of the screen protector 27 first contacts one end of the screen 2 (as shown in FIG. 9), and the scraper 28 scrapes from the edge of the second short side 253 toward the edge of the first short side 252, such that the angle between the screen protector 27 and the screen 2 is gradually decreased, and the screen protector 27 is slowly adhered to the other end of the screen 2, and finally the screen protector 27 is completely adhered to the screen 2 flat (as shown in FIG. 10). In the application process, the air between the screen 2 and the screen protector 27 can be gradually squeezed from one end of the screen 2 to the other end, so that the air can be smoothly discharged. This can prevent the air from staying between the screen 2 and the screen protector 27 to form bubbles that affect the appearance of the screen 2. In the application process, the user does not directly contact the screen protector 27. The positioning frame 25 covers the positioning seat 20, providing a dust-proof effect. The scree protector 27 can be attached to the screen 2 quickly and accurately, thereby reducing the chance of contaminating the surrounding dust greatly. The screen protector 27 is adhered to the auxiliary adhesive sheet 26 with a low-viscosity adhesive, such as silica gel, etc. The screen protector 27 is adhered to the screen 2 with a high-viscosity adhesive, such as OCA optical glue, AB glue, etc. Therefore, when the screen protector 27 is completely adhered to the screen 2, the adhesive force between the screen protector 27 and the screen 2 is greater than the adhesive force between the screen protector 27 and the auxiliary adhesive sheet 26. When the scraper 28 is removed from the auxiliary adhesive sheet 26, the auxiliary adhesive sheet 26 is no longer pressed by an external force, and the positioning frame 25 is no longer bent and deformed and is flattened by its elasticity. The elastic force of the positioning frame 25 allows the two ends of the auxiliary adhesive sheet 26 to be separated from the screen protector 27 (as shown in FIG. 11). At this time, the user can pull the positioning frame 25 from the first short side 252 away from the limiting space 24 (as shown in FIG. 12), and the auxiliary adhesive sheet 26 is torn away from the screen protector 27. Finally, the mobile phone 1 is taken out from the positioning space 23, that is, the application that the screen protector 27 is attached to the screen 2 is completed, thereby avoiding the formation of air bubbles and achieving a fast and accurate application.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A mobile phone screen protector device, comprising a positioning seat, a positioning frame, an auxiliary adhesive sheet, a screen protector, and a scraper; the positioning seat having a rectangular seat body, one short side of the positioning seat being provided with a first raised portion, another opposite short side of the positioning seat being provided with a second raised portion, the positioning seat having a positioning space between the first raised portion and the second raised portion, the positioning space being configured to accommodate and position a mobile phone with a screen facing upward, the first raised portion being higher than the second raised portion; the positioning frame having a central hole corresponding to the screen of the mobile phone, the positioning frame being in a rectangular shape having a first short side and a second short side to be placed over the first raised portion and the second raised portion; the auxiliary adhesive sheet being adhered and positioned to an underside of the positioning frame, the auxiliary adhesive sheet having a first adhesive portion attached to an underside of the first short side, the auxiliary adhesive sheet having a second adhesive portion attached to an underside of the second short side; the screen protector being adhered and positioned to an underside of the auxiliary adhesive sheet; the positioning frame, the auxiliary adhesive sheet and the screen protector being positioned and adhered together, the first short side of the positioning frame and the first adhesive portion of the auxiliary adhesive sheet being confined to a top of the first raised portion of the positioning seat, the second short side of the positioning frame and the second adhesive portion of the auxiliary adhesive sheet being confined to a top of the second raised portion of the positioning seat; the positioning frame, the auxiliary adhesive sheet and the screen protector being confined to be above the positioning space; the positioning frame, the auxiliary adhesive sheet and the screen protector being inclined at an angle relative to the screen; the screen protector corresponding to the screen but not touching the screen; the scraper being configured to press and scrape against the auxiliary adhesive sheet through the central hole from an edge of the second short side toward an edge of the first short side so that the screen protector is adhered to the screen in an oblique manner.

2. The mobile phone screen protector device as claimed in claim 1, wherein one side of the first raised portion, facing the second raised portion, has a first positioning recess, one side of the second raised portion, facing the first raised portion, has a second positioning recess, the positioning space is defined between the first positioning recess and the second positioning recess, the first positioning recess and the second positioning recess are configured to confine and position the mobile phone.

3. The mobile phone screen protector device as claimed in claim 1, wherein the top of the first raised portion has a first inclined surface that is inclined at a predetermined angle, the top of the second raised portion has a second inclined surface that is inclined at an angle same as that of the first inclined surface, the first adhesive portion of the auxiliary adhesive sheet is attached to the first inclined surface, and the second adhesive portion of the auxiliary adhesive sheet is attached to the second inclined surface.

4. The mobile phone screen protector device as claimed in claim 1, wherein an outer circumference of the top of the first raised portion is provided with a first flange, an outer circumference of the top of the second raised portion is provided with a second flange, a rectangular area surrounded by the first flange and the second flange forms a limiting space, the positioning frame corresponds in shape to the limiting space; the positioning frame, the auxiliary adhesive sheet and the screen protector are placed together in the limiting space, so that the positioning frame is confined to be above the positioning space.

5. The mobile phone screen protector device as claimed in claim 1, wherein the first short side and the second short side each have at least one reference hole, the first adhesive portion and the second adhesive portion each have a positioning hole corresponding to the reference hole, and the positioning hole is aligned with the reference hole for the auxiliary adhesive sheet to be positioned to the positioning frame.

\* \* \* \* \*